United States Patent [19]
Hergott et al.

[11] Patent Number: 5,951,391
[45] Date of Patent: Sep. 14, 1999

[54] METHOD AND MEANS FOR LINKING SAUSAGE

[75] Inventors: Steven P. Hergott, West Des Moines; Michael S. Simpson, Norwalk, both of Iowa; Rudolph P. Enklaar, Woeden, Netherlands

[73] Assignee: Townsend Engineering Company, Des Moines, Iowa

[21] Appl. No.: 08/953,322

[22] Filed: Oct. 17, 1997

Related U.S. Application Data

[60] Provisional application No. 60/028,910, Oct. 21, 1996.

[51] Int. Cl.⁶ .................................................. A22C 11/10
[52] U.S. Cl. .............................................. 452/46; 452/31
[58] Field of Search ................................. 452/46, 31, 37

[56] References Cited

U.S. PATENT DOCUMENTS

| | | | |
|---|---|---|---|
| 4,347,646 | 9/1982 | Staudenrausch | 452/35 |
| 4,370,779 | 2/1983 | Meier | 452/31 |
| 4,539,796 | 9/1985 | Nakamura et al. . | |
| 4,773,128 | 9/1988 | Stanley et al. | 452/31 |
| 4,823,439 | 4/1989 | Schnell | 452/31 |
| 5,092,913 | 3/1992 | Kasai et al. . | |

FOREIGN PATENT DOCUMENTS

| 406007073 | 1/1994 | Japan | 452/47 |
|---|---|---|---|

*Primary Examiner*—Willis Little
*Attorney, Agent, or Firm*—Zarley, McKee, Thomte, Voorhees & Sease

[57] ABSTRACT

A sausage making machine (10) has a meat pump, (22), a twister with a chuck 30 to rotate a strand of sausage, a linker (32) to create links in the strand of sausage, a conveyor (38) with movable hooks to grasp loops in the sausage strand. Four separate motors (22A, 30A, 32A, 38A) are operatively connected to the pump (22), twister (30), linker (32) and conveyor (38), and the motors (22A, 30A, 32A, 38A) are all connected to and controlled by a computer (44) control having a memory with the operating parameters of the separate components. The method of operation involves imposing the operational parameters on the memory of the computer (44) to permit the computer (44) to control and coordinate the components (22A, 30A, 32A, 38A).

5 Claims, 15 Drawing Sheets

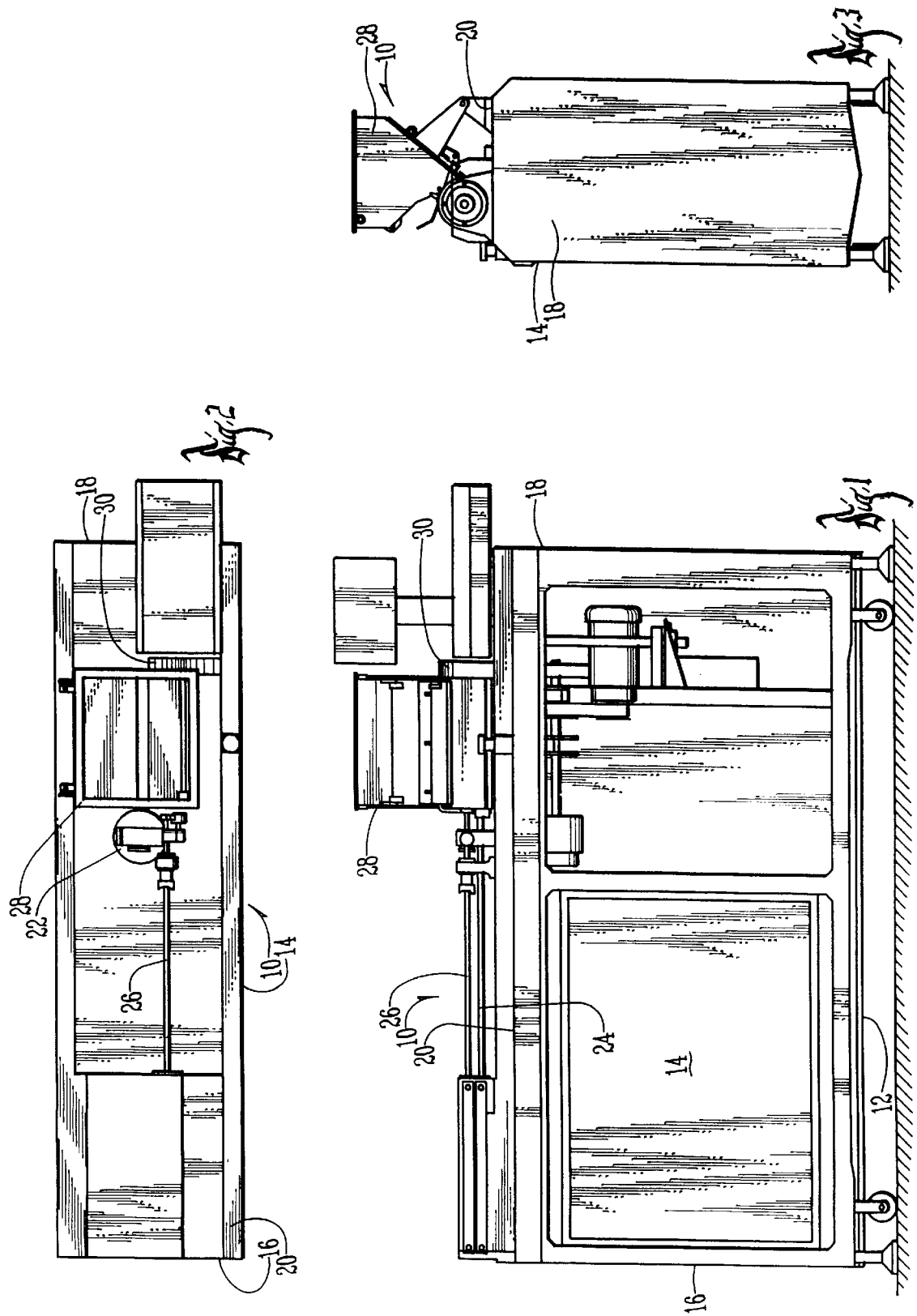

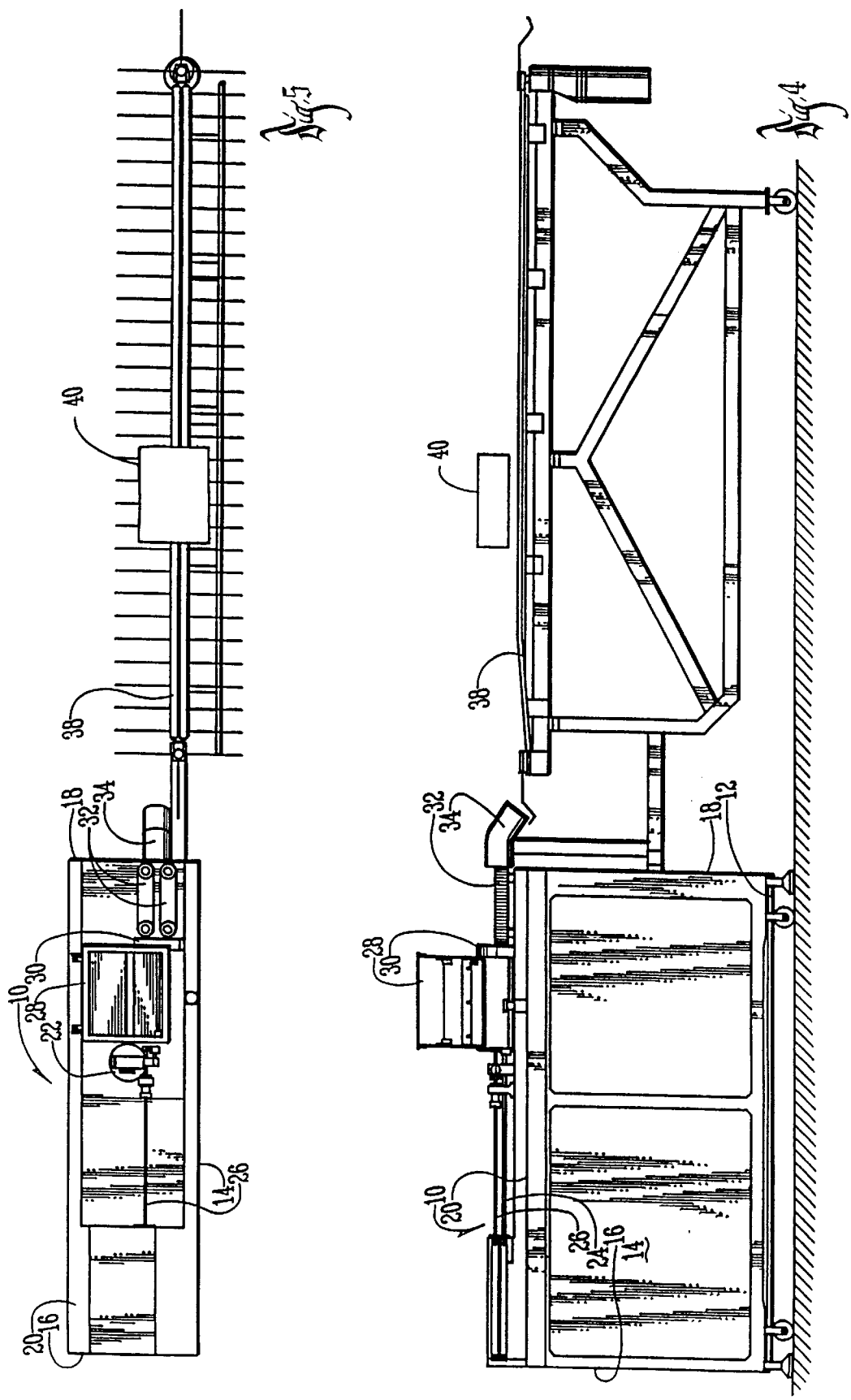

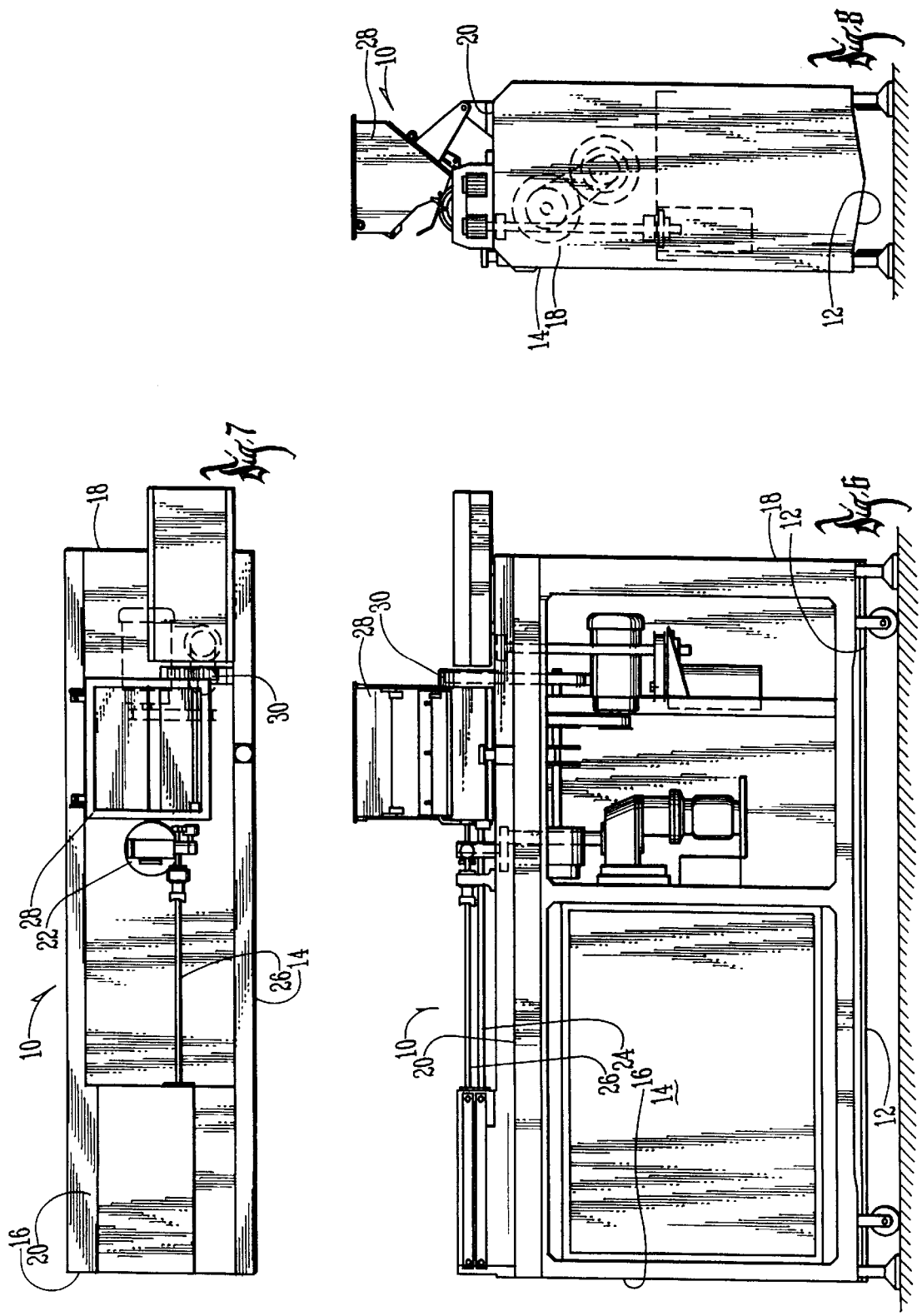

METHOD AND MEANS FOR LINKING SAUSAGE

CROSS REFERENCE TO RELATED APPLICATION

This application is based upon Applicants' Provisional Application Ser. No. 60/028,910 filed on Oct. 21, 1996.

BACKGROUND OF THE INVENTION

Sausage machines such as that shown in U.S. Pat. No. 3,115,668 have a frame, a meat emulsion pump having metering gears to control meat emulsion flow; an elongated stuffing horn, a rotatable chuck, a linking device, a discharge horn and a conveyor with hooks thereon to carry linked product away from the machine. In more recent times, separate motors are used to drive the pump, the twister (chuck), the linker, and the conveyor.

Previous linkers required the user to set-up the machine by specifying RPM's individually for each element in the process (i.e. Pump, Linker, and Twister). There was no intuitive relationship which allowed the user to accurately benchmark these settings. Equations were provided in the operator's manual, but most users opted for a trial and error approach when performing this initial setup. Unfortunately, this often resulted in lost time, bursted casings, and wasted materials.

In the past, the pump established the base speed for the system, and the linker speed was to make adjustments for weight.

Maintaining the weight of the linked product has heretofore been a cumbersome task, and often involved manual weighing steps and some trial and error compensation steps.

Prior encasing machines had no broad ranging readout means for sensing when maintenance to the machine was necessary. As a result, needed maintenance is often overlooked.

It is therefore a principal object of this invention to provide a method and means for linking sausages that utilizes computer software and a computer display touch screen to use a statistic approach to control the various phases of manufacturing sausages.

A further object of this invention is to control the pump, twister, linker and conveyor through four separate motors and through a computer which can coordinate their functions, and by using the linker motor as a master control through the computer to control the remaining motors, to achieve a constant product feed rate.

A further object of this invention is to provide a method and means for linking sausage which can provide a straightforward, interactive fine tuning for weight control.

A further object of this invention is to provide a method and means for linking sausage which will monitor preventative maintenance schedules and signal their maturity to the operator.

A further object of this invention is to provide a method and means for linking sausage which will provide a system for automatically downloading weights from a remote scale to a control system.

A still further object of this invention is to provide a method and means for linking sausage to provide a control system that will minimize the number of filled links beyond a conveyor hook adjacent to the last full loop of linked products.

These and other objects will be apparent to those skilled in the art.

SUMMARY OF THE INVENTION

The device of this invention has four motors to drive the pump; the linking chains (linker); the twister and the conveyor. There are no mechanical linkages between motor axes. The first three motors are "told" to go a certain speed by the PLC (computer), and operator, and there are no automatic checks to see that they are going the correct speed. Each motor is interdependent via a calculated ratio, based upon base speed of the linker chains motor. The motor for the linker chains is the "master" of the machine. The speed of this motor is variable, but is viewed as the base speed of the machine for ease of calculating the "links" per hour output.

The next most important motor in the machine is the metering pump motor. The speed of this motor is also variable, but is initially set up as a calculated value. During normal running of the machine, an operator will determine if the "link" (hot dog/sausage) weight is too high or too little. If it is not the correct value, then the operator will use an "up" or "down" arrow key on the computer to adjust the weight. By using these keys, the operator is actually adjusting the ratio of speed with respect to the linker of the pump motor. The value of speed that produces a correct weight "link" is stored in the computer, and the ratio of this speed to the "base" (linker) speed is also stored.

The next motor is the "twister" motor. This spins the "chuck" and produces twists between links. The speed of this motor is variable, but will be initially set up as a calculated value. During normal running of the machine, an operator will determine if there is enough twists between links or not. To change the number of twists the operator will use an "up" or "down" arrow key to increase the twist by ⅛ or decrease by ⅛. (This is really changing the ratio of speed with respect to the linker). The value of ratio that produces the correct amount of twist is stored.

The fourth motor is the conveyor motor. It is a servo motor which means it is capable of very precise movements. It's speed, direction and move distance are not variable. It accelerates to a predetermined speed, to a predetermined position and then decelerates to a predetermined position, zero speed. One motion profile available is called a triangle move, and takes approximately ⅓ of a second to complete.

The motors are interdependent. When the operator changes the speed of the linking chains, this effects all the other motors in this way:

Pump motor: the previously stored ratio of base speed to pump speed is used to calculate a new pump motor speed.

Twister motor: the previously stored ratio of base speed to twister speed is used to calculate a new twister motor speed.

Conveyor motor: The increased linker speed increases the rate at which links are exiting the machine, hence, the frequency of the "triangle motion profile" must increase. This is in accordance to a predetermined number of counts derived from the linker chain driven shaft and a calculation of links in a loop between hooks.

The interdependency is important for maintaining weight control, twist control, and hanging of the finished product during consistent running speeds as well as when the production speed (base-linker chain) has been increased or decreased.

The new operator interface allows the user to perform this initial set-up by providing two parameters which are specified in a form that the operator can easily understand. These parameters are weight and length for the desired sausage link. Software in the machines programmable controller.

then uses these parameters to benchmark RPM's for each of the individual drives. The operator then simply uses item two to fine tune the product weight. Weight control for past linkers, as well as for the linker of this invention, is achieved by changing the speed relationship between the pump and linker. Previously the operator was required to understand the relationship between a change in a particular RPM and the resulting change in weight. The operator interface of this invention allows the operator to simply specify an incremental increase or decrease in weight. The software then executes the appropriate change in RPM.

In the past, the pump established the base speed for the system, and the linker speed was altered to make adjustments for weight. If feedrate is measured in number of links per unit time, then linker speed determines this rate. With this invention, the operator is not decreasing the feedrate when he makes an adjustment for a loss in pump efficiency (i.e. a drop in mean weight of the product). This linker alters the relationship by establishing the linker as the base speed for the system.

Intervals for key maintenance activities are monitored by the control system and the operator is alerted when the interval for the required activity has been reached. For the pump this is tied to a measure of pump efficiency. For all other items it is tied to a specified number of run hours. The specific length of the interval can be input by the user.

The operator interface on the linker of this invention will provide a system for automatically downloading weights from a remote scale into the linkers control system. Statistical analysis of the data along with graphical charting can then be performed and displayed on the operator interface. This will facilitate better monitoring and decision making for the user.

The conveyor index rate defines the size of each sausage loop. Sometimes the strand length is just short of forming a complete loop at the end of the strand. When this occurs, nearly a full loop of product dangles down from the conveyor. This dangling tail will often untwist. Once the sausage cell has untwisted, it becomes unusable as an accurately formed sausage. Minimizing the length of the dangling tail optimizes utilization of casing and maximizes output in terms of links per strand. The linker of this invention can do a series of quicker indexes at the end of the strand. This will form one or more smaller loops which reduces the potential hanging tail after the last hook point.

BRIEF DESCRIPTION OF THE DRAWINGS

FIG. 1 is a front elevational view of the device of this invention;

FIG. 2 is a top plan view thereof;

FIG. 3 is an end elevational view as viewed from the right-hand end of FIG. 1;

FIG. 4 is a view of the device of FIG. 1 shown at a reduced scale with a conveyor attached to the outlet end thereof;

FIG. 5 is a top plan view of the device of FIG. 4;

FIG. 6 is a front elevational view similar to that of FIG. 1 but with the power train shown thereon;

FIG. 7 is a top plan view similar to that of FIG. 1 but also showing the power train imposed thereon;

FIG. 8 is an end elevational view similar to that of FIG. 3 but shows the power train imposed thereon;

DESCRIPTION OF THE PREFERRED EMBODIMENT

Figure 9:
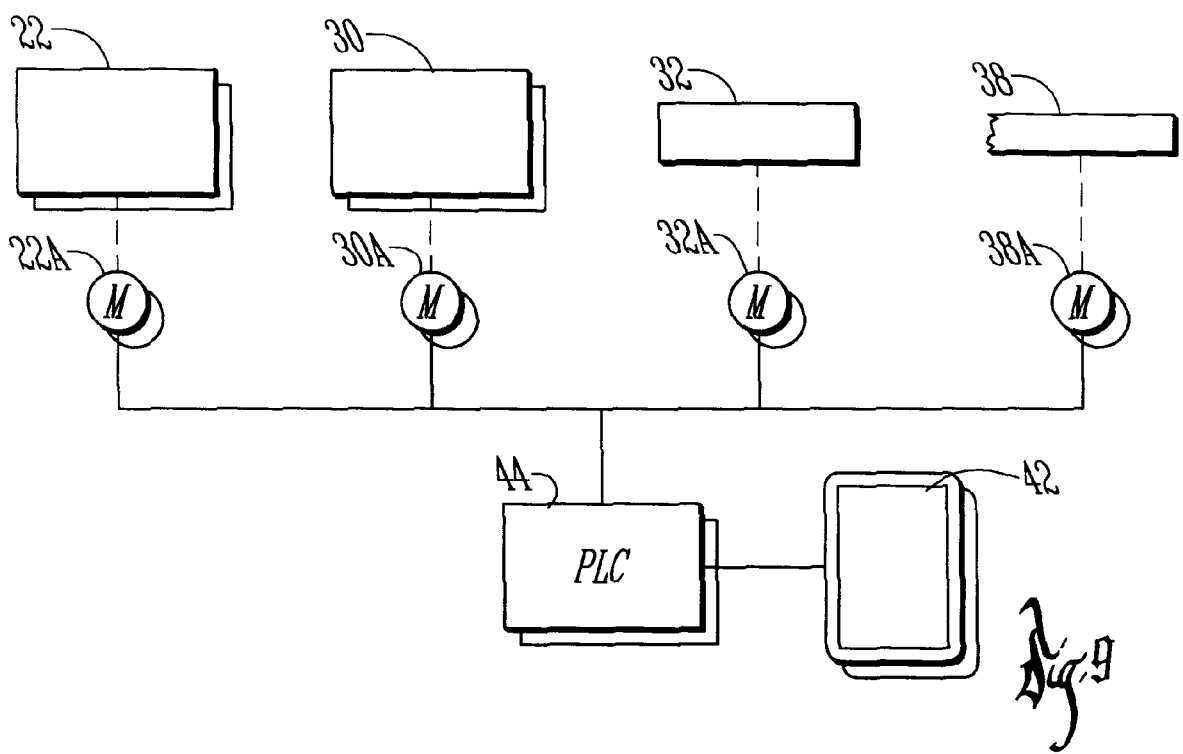
FIG. 9 is a schematic drawing of the computer/motor control system.
Figure 10:
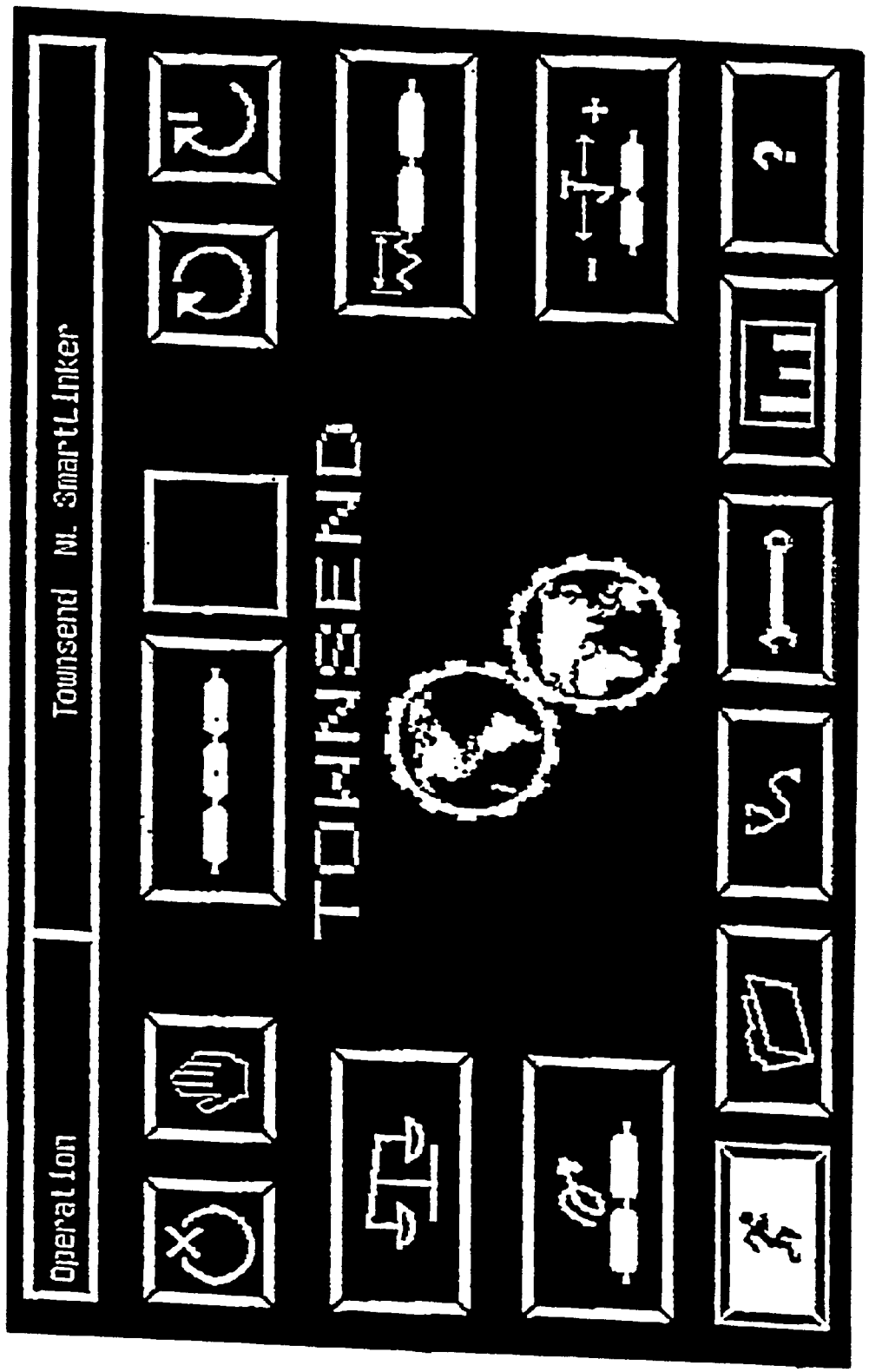
FIGS. 10–20 are computer touch screen images.
Figure 11:
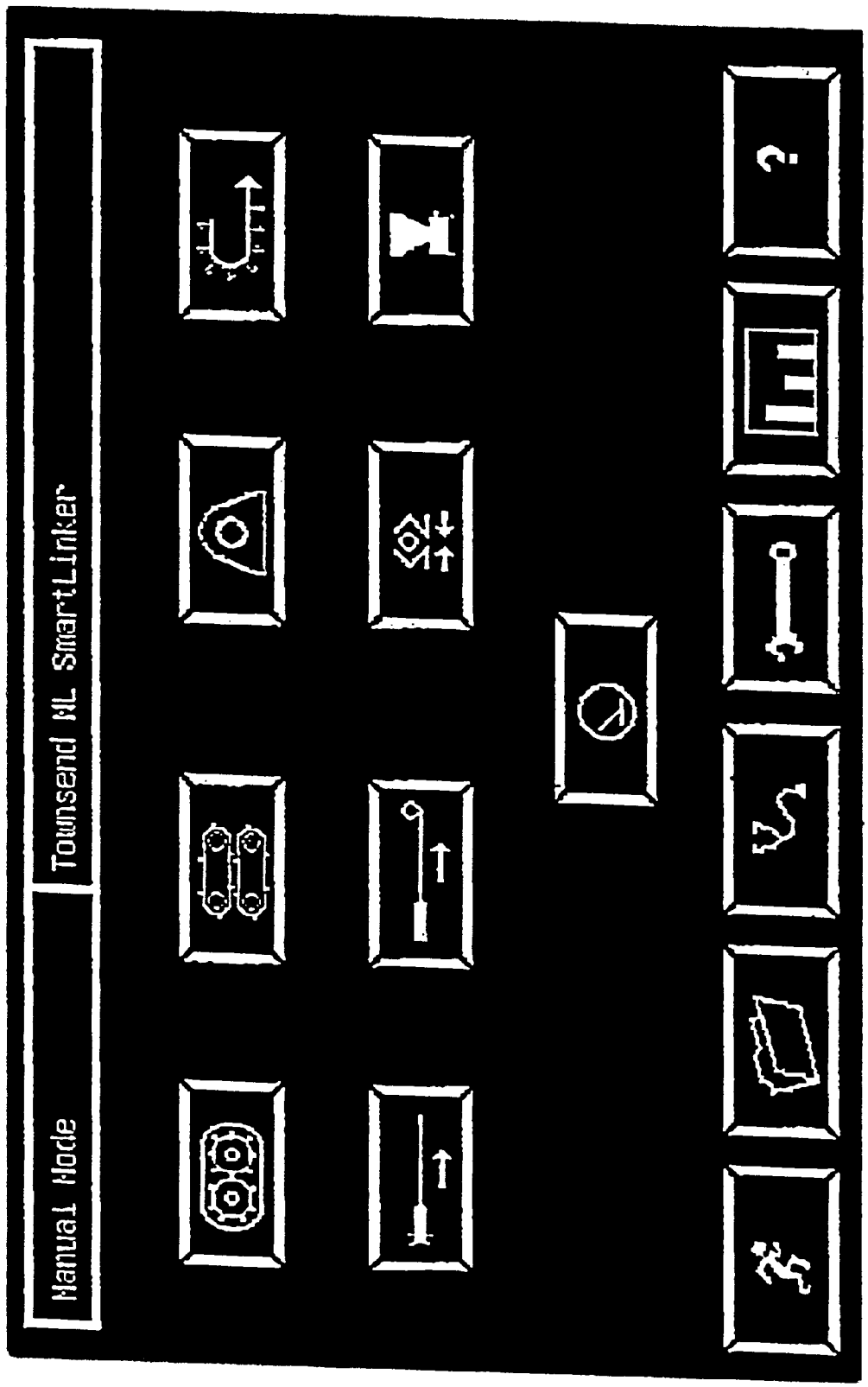
Figure 12:
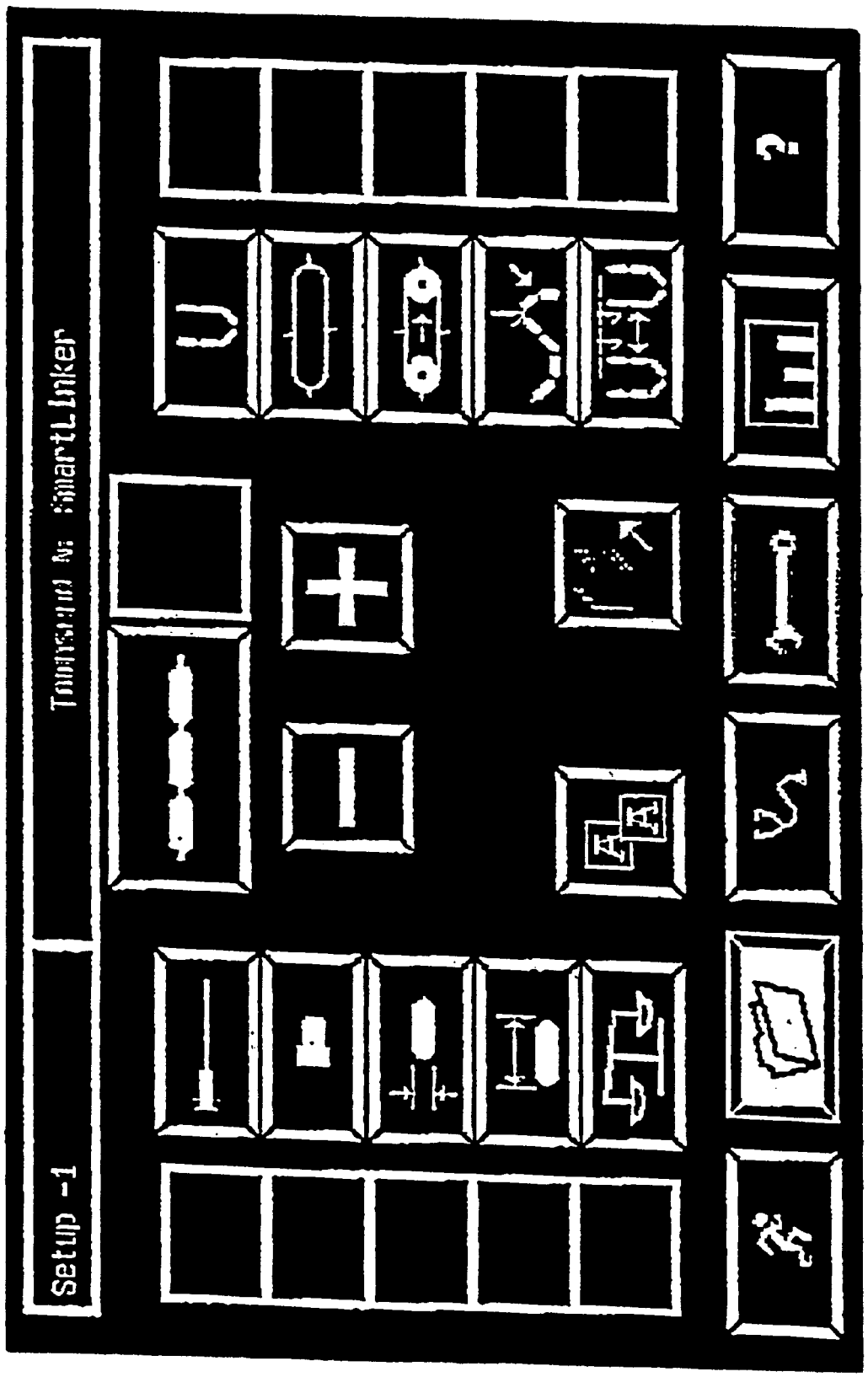
Figure 13:
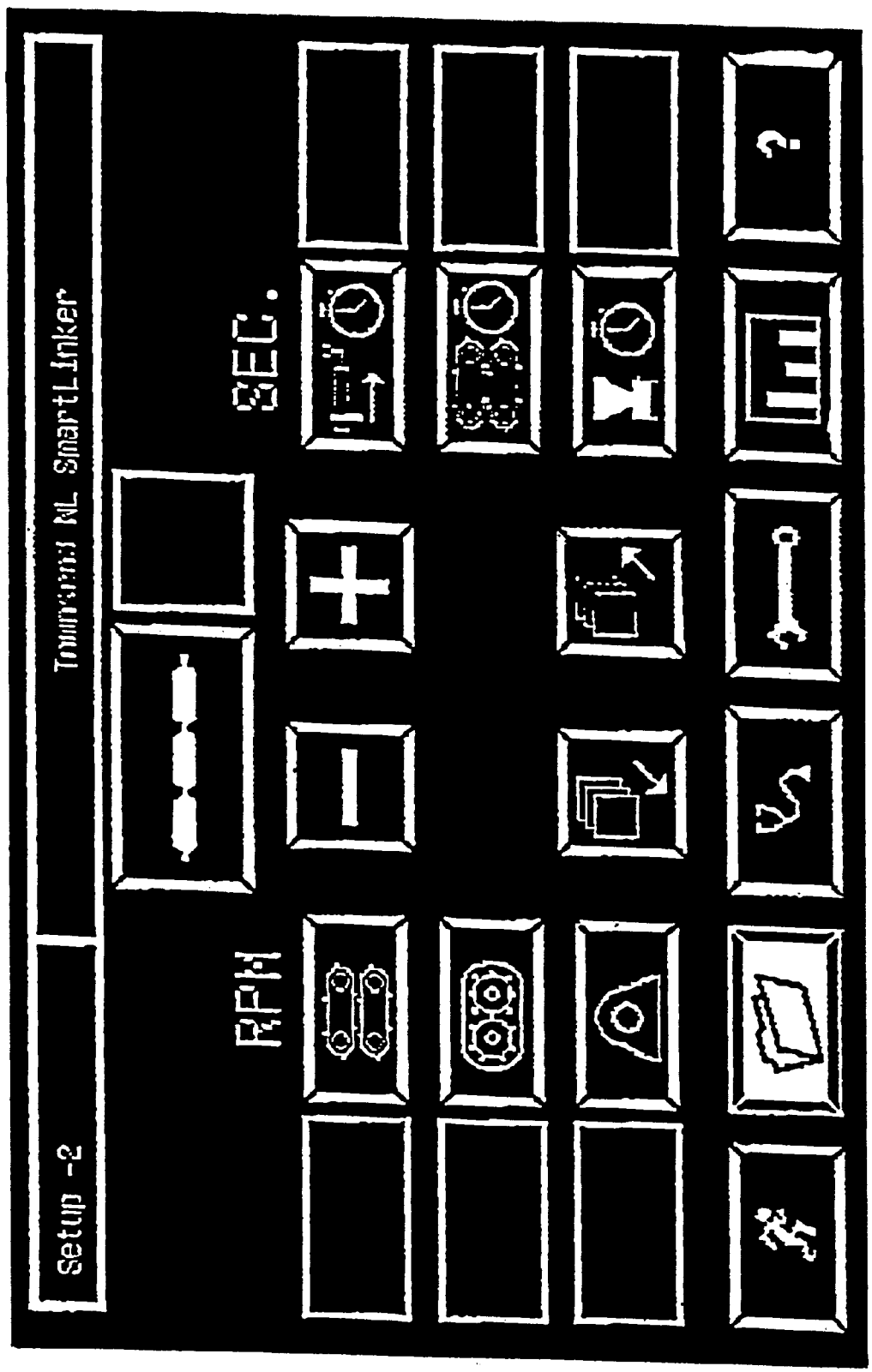
Figure 14:
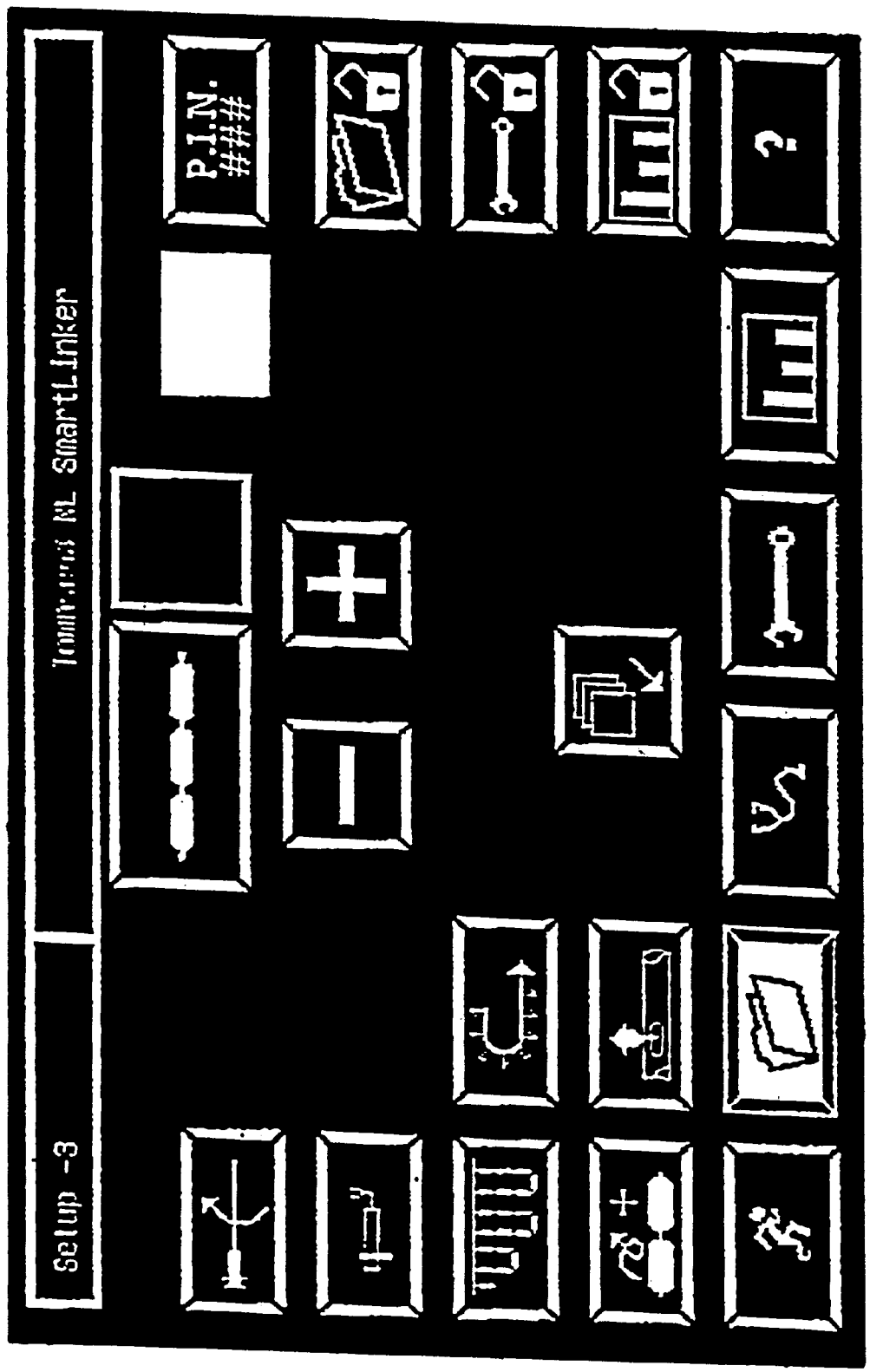
Figure 15:
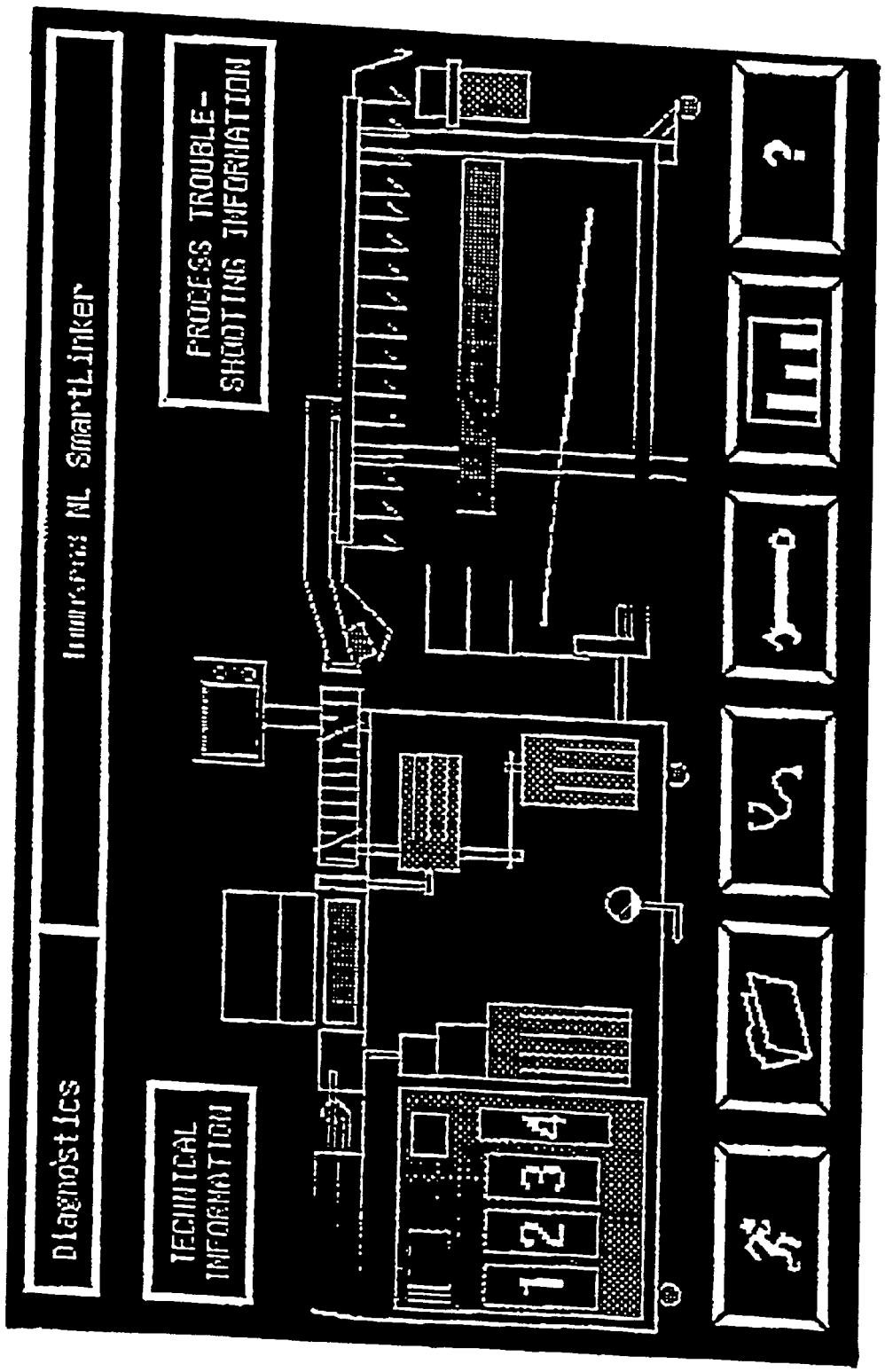
Figure 16:
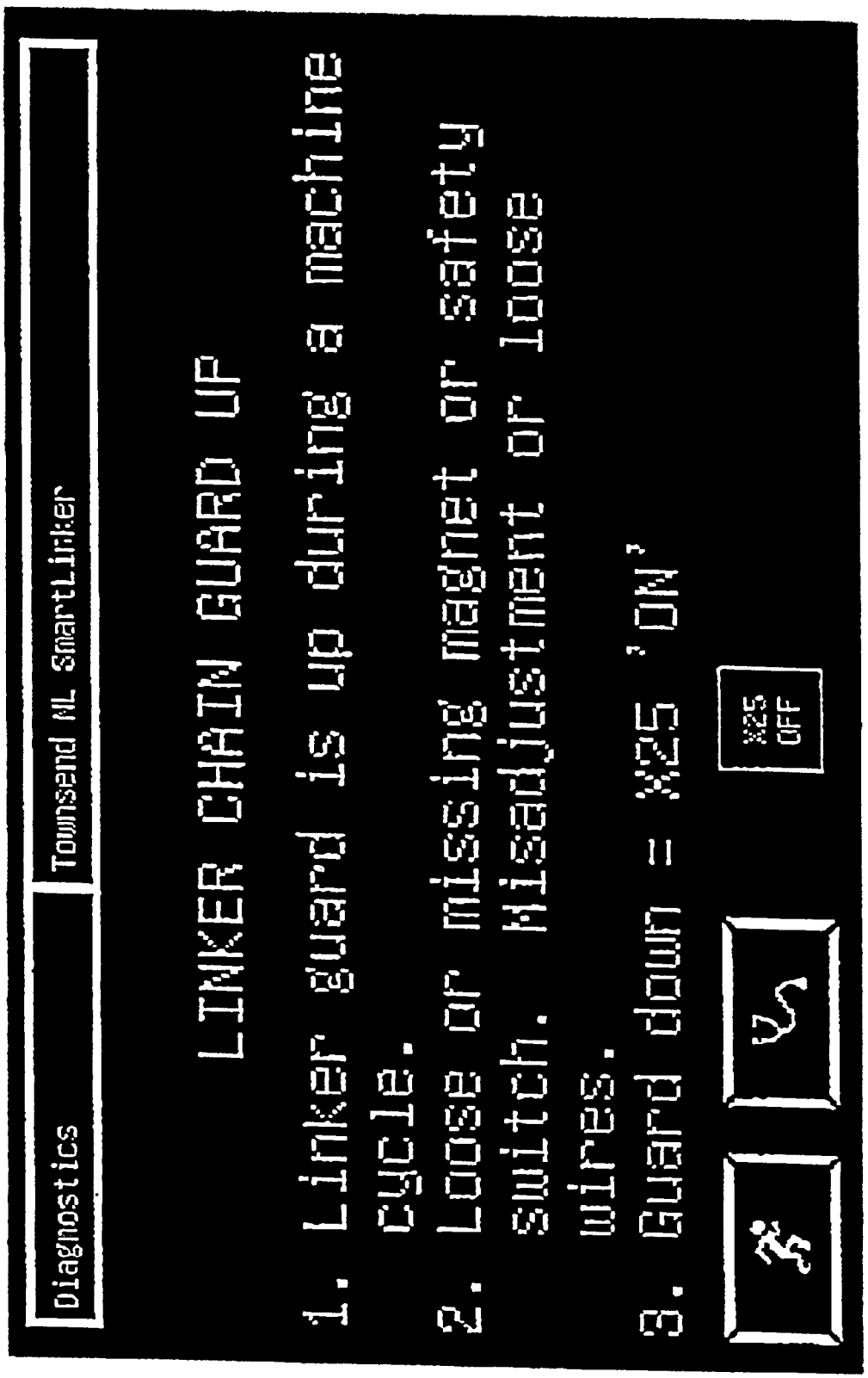
Figure 17:
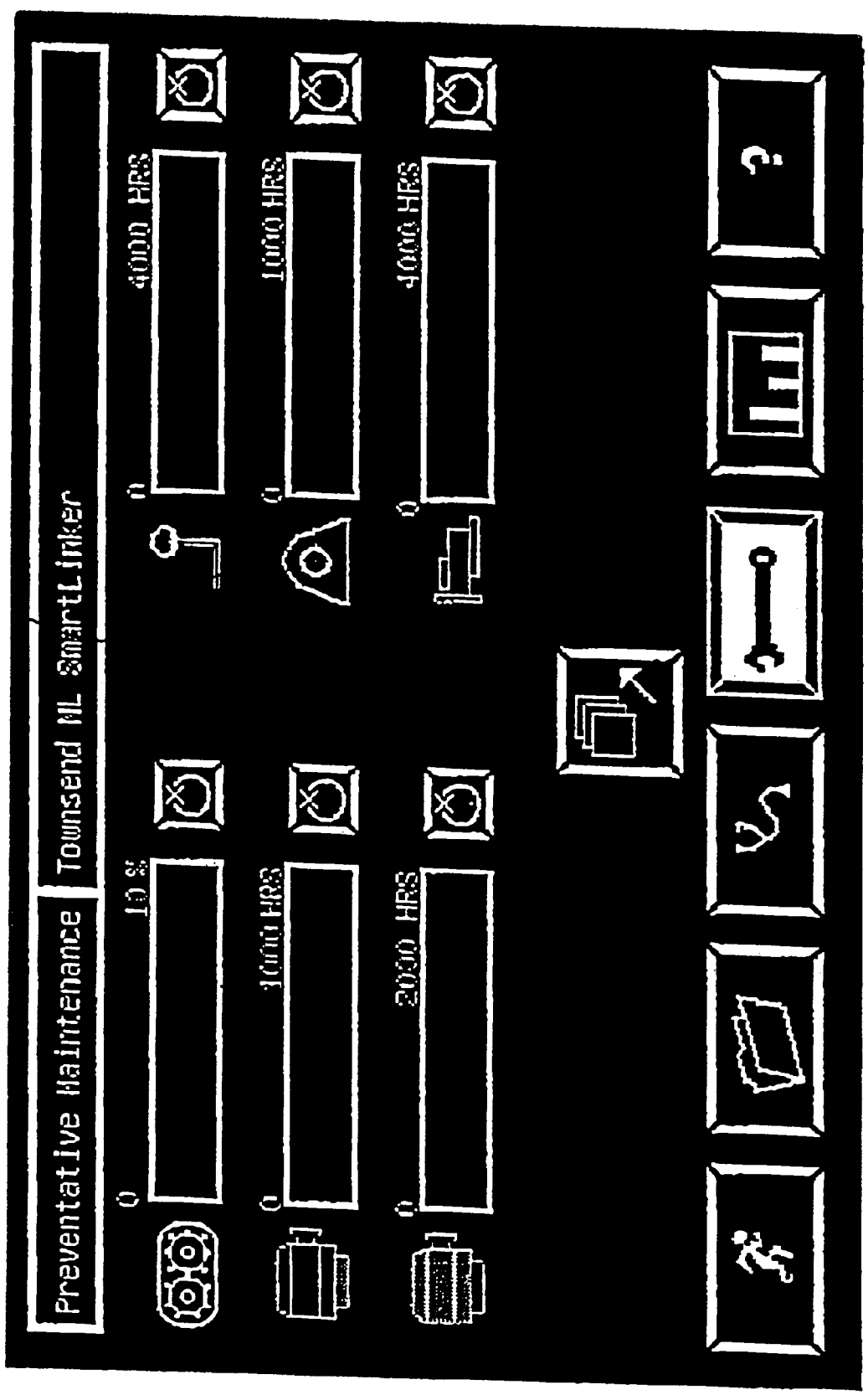
Figure 18:
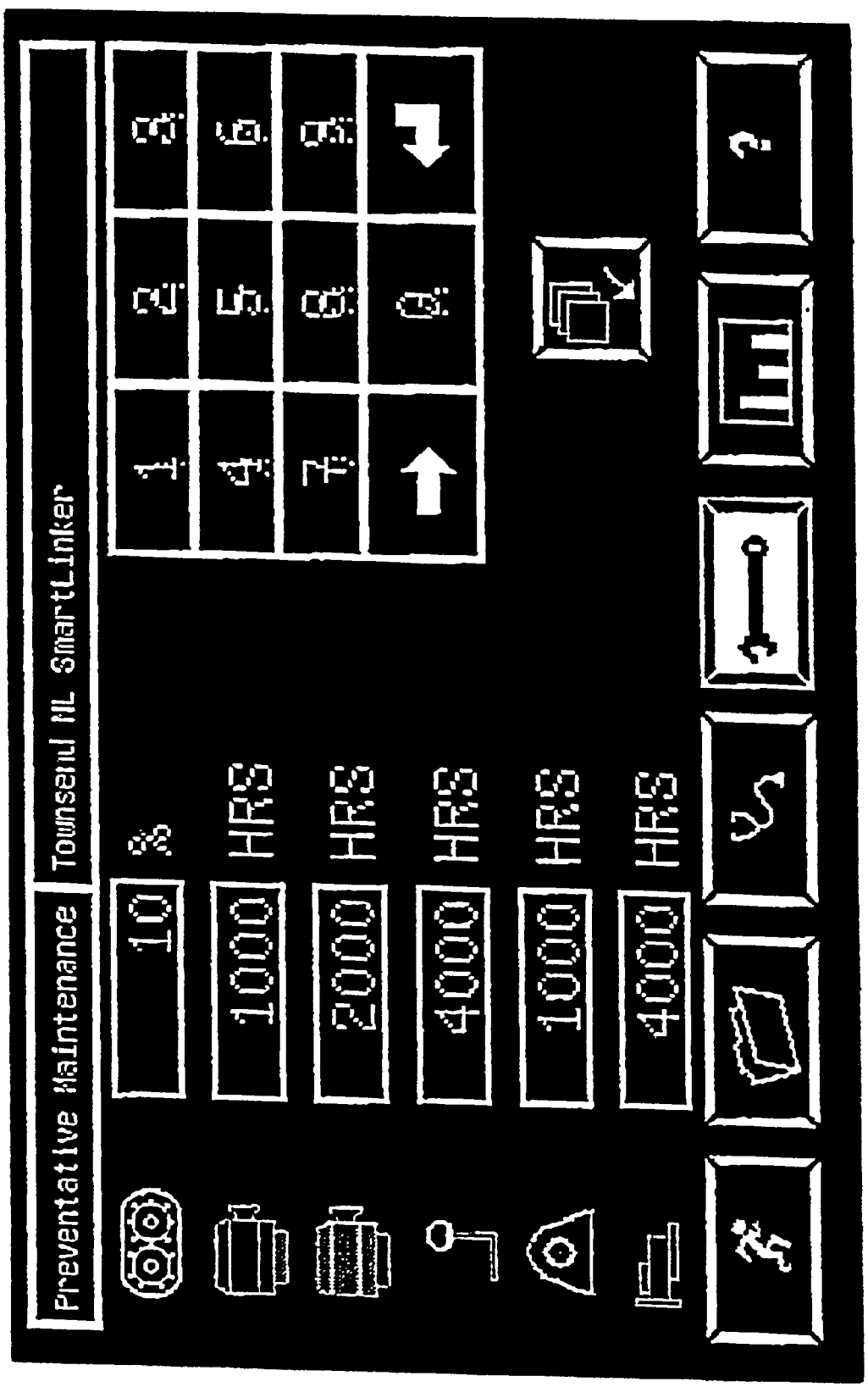
Figure 19:
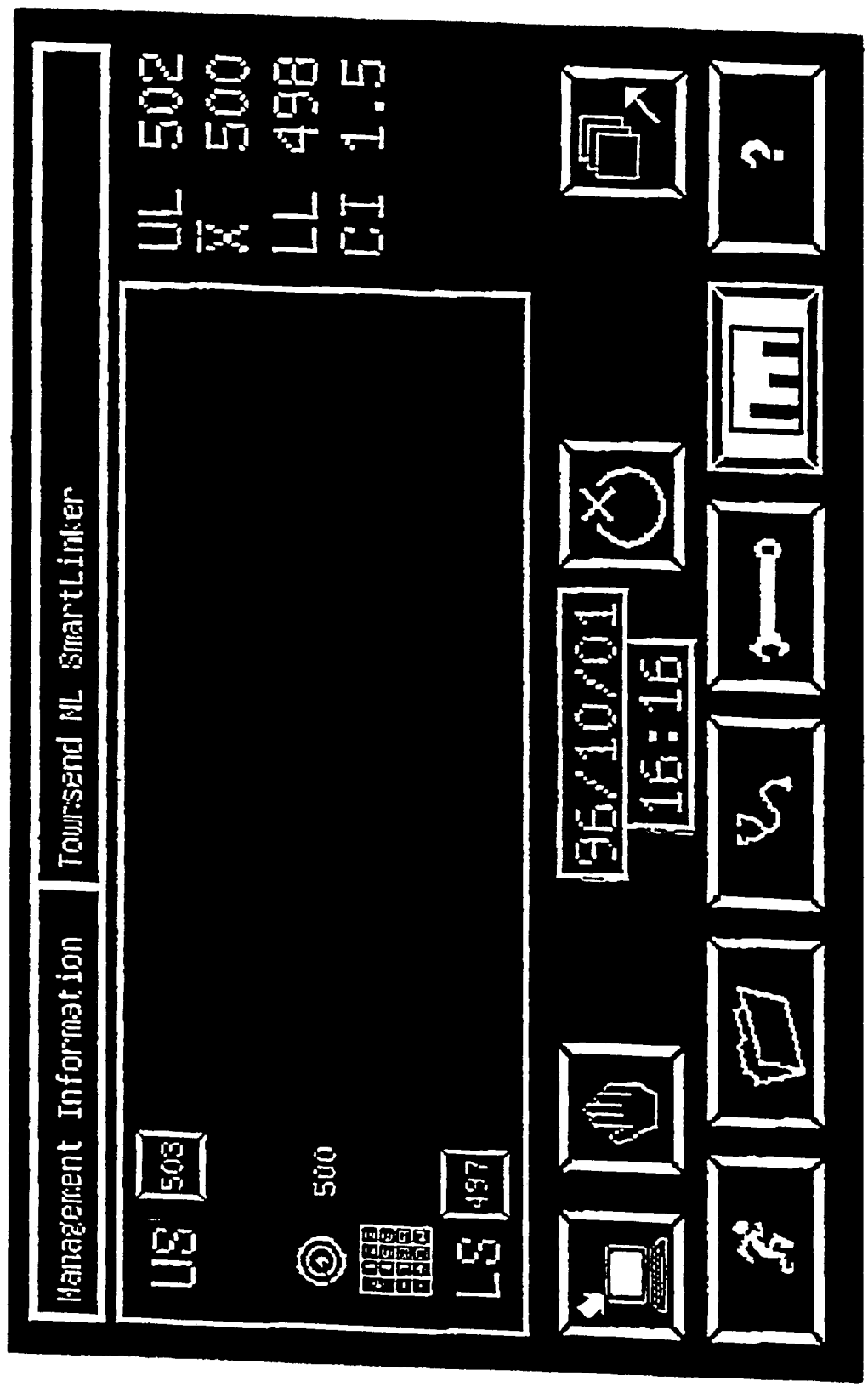
Figure 20:
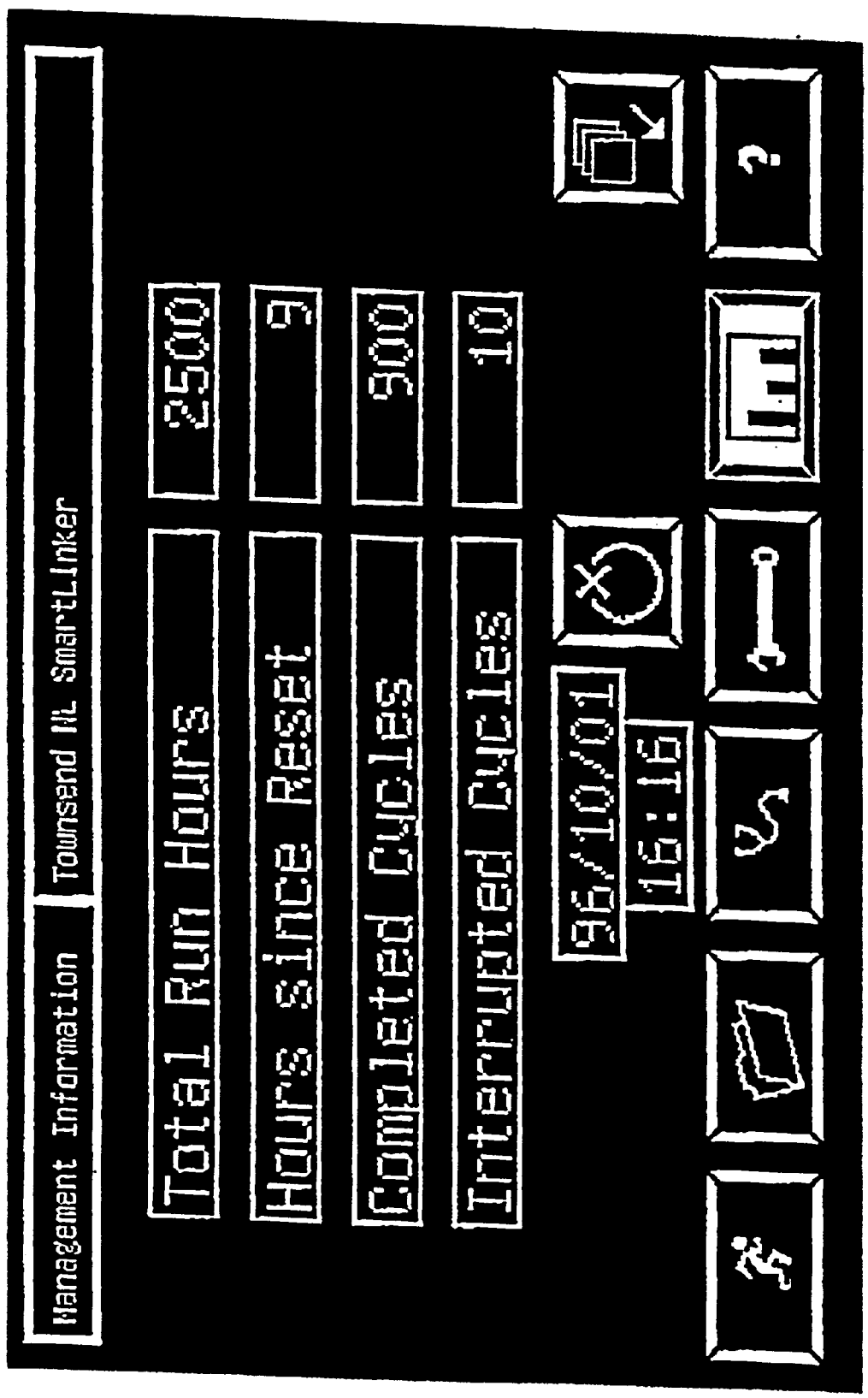

The numeral 10 comprises a sausage linker machine having a frame 12 which is comprised from front 14, and 16 and 18, and top 20.

A conventional emulsion pump 22 is mounted on frame 12 and is in communication with a conventional hollow elongated stuffing tube 26 through which the meat emulsion is moved by pump 22. An elongated follower arm 24 is mounted on the top of frame 12. A casing hopper 28 is mounted on the top of frame 12. A chuck 30 is mounted on the frame at the discharge end of stuffing tube 26. A conventional set of linking chains 32 is mounted on frame 12 immediately downstream from chuck 30. Linked sausages move conventionally from the linking chains 32 through discharge tube 34 onto a conveyor 38 having a load cell 40 (scale).

A computer touch screen 42 (FIG. 9) is operatively secured to a PLC 44 (FIG. 9). Typical screen images appear in FIGS. 10–20.

We claim:

1. A method of controlling the output of a sausage encasing machine having a pump, a twister, and a linker, each powered by one of three separate motors, comprising, interconnecting said motors to a computer control having a memory, imposing on said computer the parameters of a linked product as to length and weight, operating said machine to produce a linked product in accordance with said parameters, and adjusting the speed of the motor connected to said linker to cause a corresponding change in the motors connected to said pump and said twister to compensate for any variance of such linked product with respect to said parameters.

2. A method of claim 1 comprising the further step of measuring a linked product so produced to ascertain any variance of such linked product with respect to said parameters.

3. A linker machine comprising a pump, a twister, and a linker, each powered by one of three separate motors, a computer operatively connected to said three motors, first control means on said computer for permitting the motors connected to said pump and said twister motor to be separately and independently controlled, and second control means connected to said three motors whereby a change of speed imposed upon said linker motor will cause a corresponding change in speed in said pump and twister motors.

4. The device of claim 3 wherein said machine includes a conveyor having a motor, said conveyor motor being linked electronically to said linker motor.

5. The device of claim 3 wherein means are associated with said parts to measure the magnitude of use of the pump, the twister or the linker, said means connected to said computer to visually indicate that maintenance is required when the magnitude of use of the pump, the twister or the linker, reaches a predetermined level.

* * * * *

UNITED STATES PATENT AND TRADEMARK OFFICE
CERTIFICATE OF CORRECTION

PATENT NO. : 5,951,391
DATED : September 14, 1999
INVENTOR(S) : Steven P. Hergott; Michael S. Simpson, Rudolph P. Enklaar It is certified that error appears in the above-identified patent and that said Letters Patent is hereby corrected as shown below:

Column 4, lines 30 through 42 should be printed as follows:

interconnecting said motors to a computer control having a memory, imposing on said computer the parameters of a linked product as to length and weight, operating said machine to produce a linked product in accordance with said parameters, and adjusting the speed of the motor connected to said linker to cause a corresponding change in the motors connected to said pump and said twister to compensate for any variance of such linked product with respect to said parameters.

Signed and Sealed this

Eleventh Day of April, 2000

*Attest:*

Q. TODD DICKINSON

*Attesting Officer*  *Director of Patents and Trademarks*